(No Model.) 2 Sheets—Sheet 1.
R. M. SHAFFER.
COOKING UTENSIL.
No. 525,968. Patented Sept. 11, 1894.
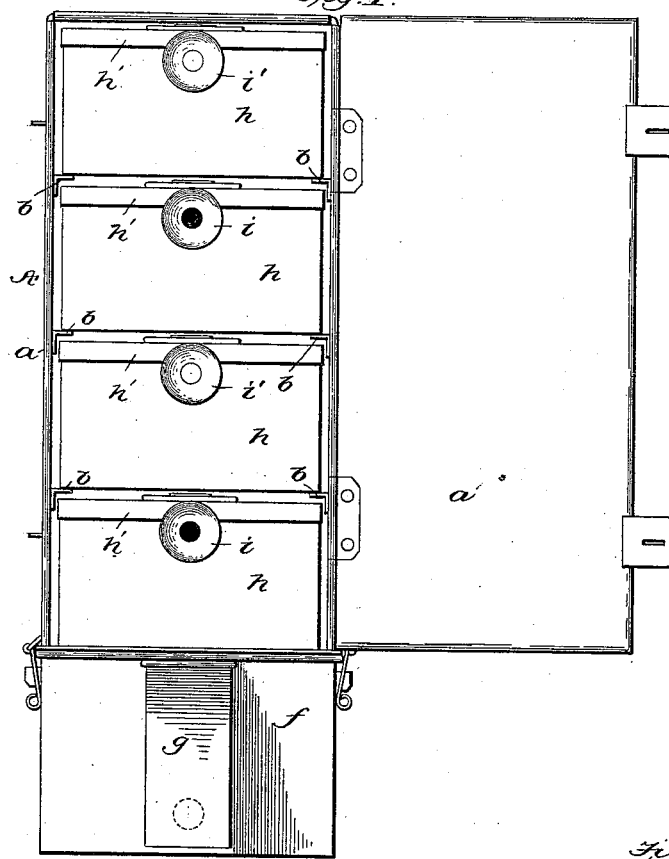
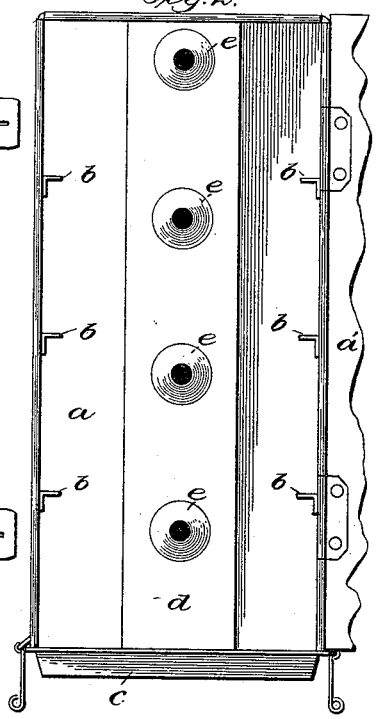
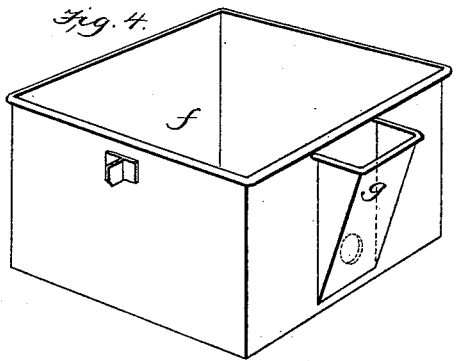
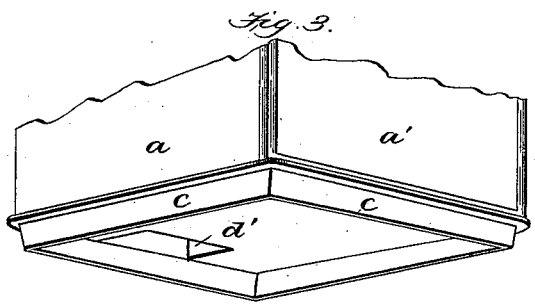

(No Model.) 2 Sheets—Sheet 2.
R. M. SHAFFER.
COOKING UTENSIL.
No. 525,968. Patented Sept. 11, 1894.
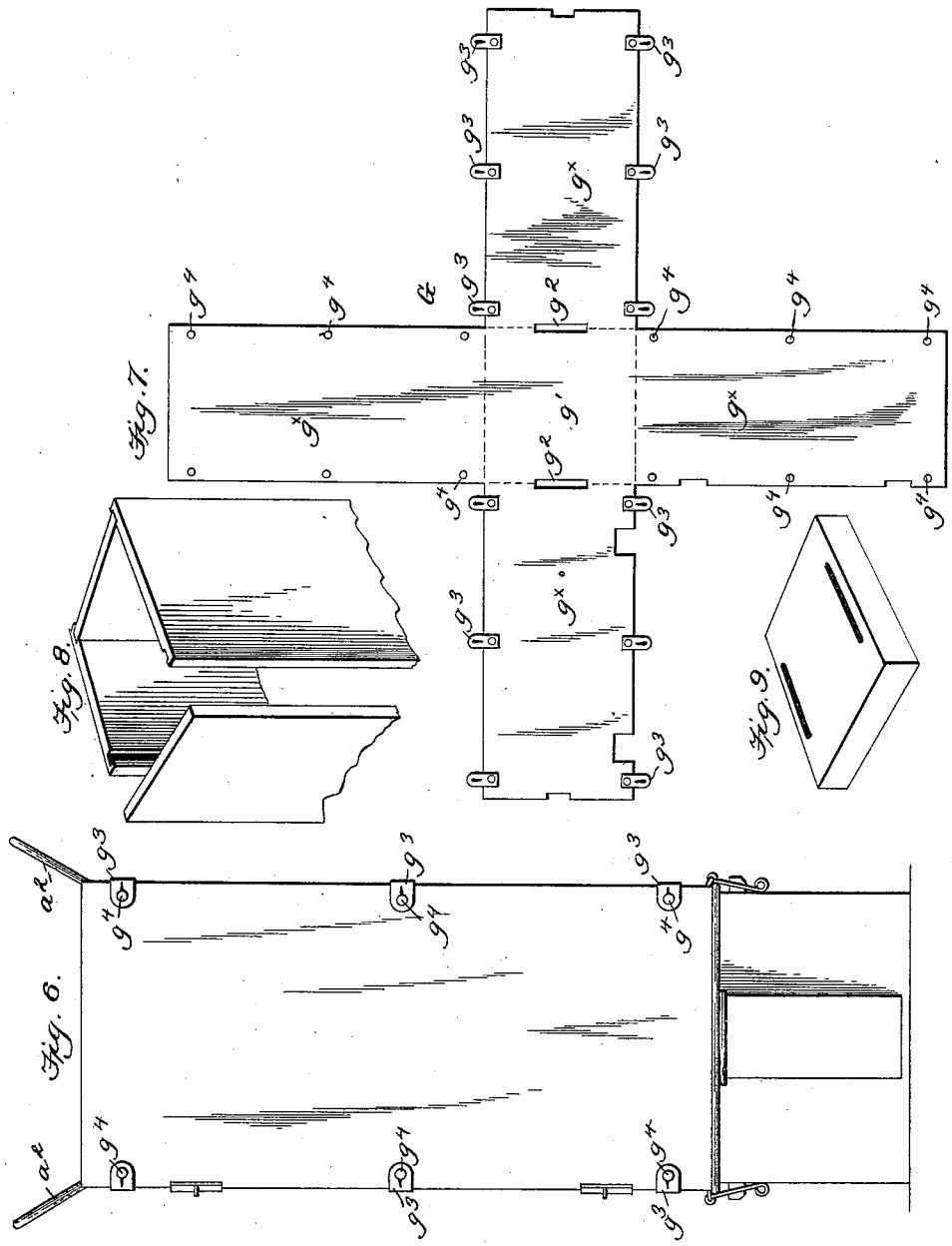

UNITED STATES PATENT OFFICE.

RICHARD M. SHAFFER, OF BALTIMORE, MARYLAND.

COOKING UTENSIL.

SPECIFICATION forming part of Letters Patent No. 525,968, dated September 11, 1894.

Application filed January 22, 1894. Serial No. 497,640. (No model.)

*To all whom it may concern:*

Be it known that I, RICHARD M. SHAFFER, a citizen of the United States, residing at Baltimore, in the State of Maryland, have invented certain new and useful Improvements in Cooking Utensils; and I do hereby declare the following to be a full, clear, and exact description of the invention, such as will enable others skilled in the art to which it appertains to make and use the same.

My invention relates to cooking utensils, and has for its object the provision of means whereby a variety of articles can be separately cooked, by steam-heat, and conveyed through a main conduit.

In carrying out my invention I provide a series of removable receptacles one or more of which can be independently adjusted to enable the contents thereof to be subjected to a given quantity of heat, or to completely cut off the supply thereto, without removal from the incasement in which the several receptacles are inclosed while under treatment.

My invention further consists of a removable cover composed of material that will prevent loss of heat by radiation afterward.

My invention further consists of novel and useful devices for the purpose set forth and combinations thereof whereby separate edibles can be cooked with more or less given rapidity and afterward retained in a heated condition.

My invention is hereinafter fully described, illustrated in the drawings, and specifically pointed out in the claims.

Referring to the accompanying drawings, wherein like letters of reference point out similar parts on each figure, Figure 1. represents a front elevation of my invention, with door thrown wide open, having four cooking vessels therein, showing alternately the front and rear sides thereof. Fig. 2. is an inner view of the incasement, all the cooking vessels removed therefrom, the door being partially shown. Fig. 3. is a view of the under surface of lower end of the incasement. Fig. 4. is a detail upper perspective view of the heat supplying reservoir. Fig. 5. is a detail sectional view of the steam conduit extending on rear of the encasement showing portion of one of the cooking vessels, illustrating method of transmitting heat thereto. Fig. 6. is a front elevation of the device the incasement being inclosed in a non-radiating cover. Fig. 7. is a detail view of the cover. Figs. 8. and 9. represent on a reduced scale other forms of cover to prevent loss of heat.

In the drawings,—A, represents the incasement having sides and back, $a$, and a front hinged door, $a'$, which has fastening devices, as shown in Fig. 1, whereby said incasement can be hermetically closed. The incasement is provided with a heat conduit, $d$, extending vertically inside the full length thereof, and permanently secured to its back, $a$. Said conduit is closed at its upper end, but has open lower end, $d'$, as illustrated in Fig. 3.

The conduit is provided at given points of its length with inwardly inverted cones, $e$, with central apertures, for a purpose presently set forth.

At lower end of the incasement extending downwardly therefrom is a quadrangular inwardly inclined flange, $c$, by which removable connection is made with heat supply reservoir, $f$. At each inner side of incasement, A, the full width thereof, is a series of flanges, $b$.

The cooking vessels, $h$, are quadrangular in form, and can be inserted in the incasement, resting on flanges, $b$, and be independently withdrawn as will be readily understood. By this construction one or more can be removed from the inclosure, and others inserted if required, in place of those withdrawn.

In the drawings, I have illustrated four vessels, $h$, but the number may be increased or diminished without departing from the scope of my invention. Each vessel, $h$, is provided with a removable cover, $d'$. At rear of each cooking vessel, near the upper end thereof, is an outwardly extending curvilinear flaring flange, $i$, having a central aperture, which flanges, when vessels, $h$, are inserted in the inclosure, in position shown in the first and third vessel illustrated in Fig. 1, will lap over an aligning apertured cone, $e$, of conduit, $d$, and, as will be readily understood, a current of heat will constantly flow into each one or more vessels adjusted as described, with its open flange overlying juxtaposing cone of the heat conduit. See Fig. 5.

At its front each vessel, $h$, is provided with a similar flange, $i'$, in like position as the one at the rear, and of like size and construction, with the exception that it has a closed apex, and when one or more of such vessels are reversed in position shown in the second and fourth one, in Fig. 1, said flange will overlie the respective cone, $e$, of conduit, $d$, hermetically closing the central aperture thereof and as will be readily understood, the supply of heat will be thus cut off.

A reservoir, $f$, is provided to be placed at base of the incasement, which as before set forth, has inclined lower flange at end thereof, that fits into open upper end of reservoir, and the incasement is held therein vertically, side clasping intermeshing connections being attached to each of said members of the device. At front end of reservoir, $f$, is a supply spout, $g$. At lower end of front wall of reservoir, is an orifice shown in dotted lines, Figs. 1 and 4.

In practice the device is adjusted as shown in Fig. 1, with any number of cooking vessels deposited therein, arranged with the front and rear sides as required, according to the manner in which the contents thereof are to be treated, it being understood that as the cooking progresses, their position may be reversed so as to admit, or entirely cut off, flow of heat therein.

It is well known that food of certain characters need more rapid treatment than others and my invention is especially adapted for such purpose. When the contents of one or more of the vessels has reached a certain ebullition or other degree of cooking, reversion of the vessel will arrest further progression thereof, but as it may be necessary to keep the food warm, its inclosure in the incasement, with direct supply of heat to interior of vessel in which it is deposited cut off, will effect this desired purpose.

As before set forth, I do not limit practice of my invention to any special number of vessels, $h$, nor is it necessary that the whole number be deposited within the incasement. The cover, $h'$, from any one may be removed, and by leaving out the vessel which would be placed on the next flanges above said open vessel, there can be deposited therein a piece of food of large size that would project above said open vessel, it being understood that in such case, if required, the orificed flange, $e$, next above may be closed with a plug.

The incasement with inclosed vessels may be placed on any form of stove, boiler, or other heat generating device, or a lighted gas jet may be led under the reservoir, $f$, which is supplied with water through spout, $g$, preferably previously heated, which through opening in front of said reservoir will be led therein. This water will generate steam which will pass upwardly through lower opening, $d'$, into duct, $d$, and from thence be discharged through openings of inverted cones, $e$, when not covered up by flanges, $i'$, on face of vessel, $h$, or when aligning closing flange is present by absence of vessel in a respective compartment, any suitable closing mechanism may be employed.

In combination with the apparatus described, I preferably employ a removable and adjustable cover, G, to prevent loss of heat by radiation. It may be made of asbestos or equivalent non-conducting substance.

In Figs. 6 and 7, I illustrate one form of heat protecting shield or cover composed of straight strips, $g^x$, $g^x$, extending at right angles from a quadrangular center, $g'$, all of one integral piece of material. At opposite sides of the central portion, $g'$, are straight slots, $g^2$, for passage therethrough of handles, $a^2$, of the incasement, whereby, when said cover, G, is adjusted, as shown in Fig. 6, the whole device with its inclosures may be carried about from place to place and the contents preserved in their heated condition. This will be of great benefit and usefulness, and provides advantages not found in analogous devices.

When the cooking is completed, in a kitchen or at the source of heat supply, the whole apparatus can be carried up to the dining room or other apartment and the normal heat preserved.

The cover, G, is provided with interlocking members, $g^3$ $g^4$, by which it can be secured in position, as shown in Fig. 6, any suitable mechanism for making such connections may be employed without departing from my invention.

I do not limit myself to the exact character of cover, G hereinbefore described, as it may be constructed in various forms.

A modification is shown in Figs. 8 and 9, which consists of a series of rectangular panels constructed to slide together by means of tongues and mortises at respective ends thereof. Such panels may be composed of any suitable non-conducting material; they may be pads stuffed with comminuted wood, pulp, fiber, felt, or any substance such as employed for analogous purposes.

Having now fully described my invention and the manner of its operation, what I claim, and desire to secure by Letters Patent of the United States of America, is—

1. A steam cooking device consisting of an incasement, A, with front door hinged thereto, provided with interior vertical steam conduit, $d$, at its rear, with lower induction opening, $d'$, said conduit having orificed inverted cones, $e$, in position to engage flanges extending outwardly from front and rear of culinary vessels, $h$, removably adjustable on flanges, $b$, on each inner side of the incasement, A, substantially as described.

2. In a steam cooking apparatus, a series of vessels, $h$, each having at its rear, outwardly flaring centrally orificed flange, $i$, and at its front, similar flange with closed apex, said vessels adapted to be superimposed within an incasement, supplied with vertical heat conduit, having a series of orificed inwardly extending cones, *e*, which will engage flaring flange of each vessel as introduced, whereby as said vessels are projected rearwardly, heat will flow therein through orifices, of engaging flanges, *e, i*, and when said vessels are reversed, transmission of heat will be arrested, substantially as described.

3. A steam cooking apparatus of the character described having vertical incasement, A, provided with lower inwardly inclined flanges, *c*, reservoir, *f*, into which flanges of incasement fit, the incasement provided with vertical conduit, *d*, with lower opening, *d'*, through which heat generated in the reservoir will pass upwardly and be ejected through apertured cones, *e*, through apertures in flanges at rear of a series of vessels brought into alignment therewith, and be arrested when said vessels are reversed, substantially as described.

In testimony that I claim the invention above set forth I affix my signature in presence of two witnesses.

RICHARD M. SHAFFER.

Witnesses:
 ALBION MELLEN,
 CHAS. H. GREEN.